United States Patent Office 3,305,482
Patented Feb. 21, 1967

3,305,482
MONOMOLECULAR LUBRICANT

Don H. Ulman, Minneapolis, Minn., assignor to Honeywell Inc., a corporation of Delaware
No Drawing. Filed Jan. 2, 1964, Ser. No. 335,395
2 Claims. (Cl. 252—11)

This invention is related to lubrication and particularly to monomolecular lubrication. Monomolecular lubrication comprises the application of an extremely thin (one molecule thickness) layer of lubricant to the surface to be lubricated.

A particular application of monomolecular lubrication is a gas or air journal bearing of th ehydrodynamic type. Under starting conditions, the rotating and nonrotating portions of the hydrodynamic journal bearing are in contact with each other. Consequently, a high frictional coefficient therebetween is undesirable because of the high starting torque requirements and the wear associated with the relative movement between the contacting surfaces. Because gaseous support is being utilized in the hydrodynamic bearing liquid type lubrication techniques cannot be utilized.

There have been various studies of the effect of thin films of polar organic compounds decreasing the coefficient of kinetic friction between two relatively movable solid surfaces. The early work was limited to mono or multilayers of those substances which were capable of being floated on water as insoluble monolayers. Lateral pressure was applied to the floating layer and the surface to be lubricated was slowly raised through the water surface and a monolayer was transferred like a carpet to the surface to be lubricated. More recent work at the U.S. Naval Research Laboratory has resulted in techniques wherein monomolecular films are formed by adsorption on a solid surface. These techniques comprise immersing the surface to be lubricated into a liquid solution containing the lubricant and slowly withdrawing therefrom while controlling the temperature and withdrawal speed.

Both the early techniques and the adsorption techniques require the surface to be treated to be ultra-clean or chemically clean. That is, the surface film contamination or the surface to be lubricated must be removed from the surface so as to expose the high energy level substrate surface. Those skilled in the art, are well aware of the difficulty in obtaining an ultra-clean or chemically clean surface. Various elaborate techniques have been developed for producing such ultra-clean surfaces. For example thin specimens such as a non-oxidizable metal foil may be cleaned by first immersing the metal foil in an hot oxidizing acid and rinsing it with distilled water so as to remove the inorganic contamination. Then the surface is exposed to a flame which oxidizes and volatilizes the organic contamination. At this point the metal foil is chemically or ultra-clean, however, a subsequent cooling of the metal foil is extremely critical since exposure to the atmosphere for only a few minutes results in contamination of the surface.

Bulk specimens present an even more difficult problem. Various mechanical cleaning and subsequent washing techniques have been utilized, but have not been successful unless the surface to be lubricated is planar in shape. This is rarely, if ever, the case. In our gas journal bearing example, the bulk specimens to be lubricated are the cylindrical shaft and the cooperating cylindrical chamber. Attempts to ultra-clean or chemically clean such specimens by flooding with a powerful oxidizing acid and subsequent rinsing with a neutralizing solution have been as unsatisfactory as the mechanical cleaning techniques. With such high standards of cleanliness, even handling the particular specimen during this cleaning process is a difficult problem and must be done with ultra-clean or chemically clean implements.

The applicant has provided a unique composition of a monomolecular type lubricant and a unique process of applying a monomolecular film of lubricant to a solid surface. The applicant's invention eliminates the problems associated with the prior art methods of cleaning the surface to be lubricated to an ultra-clean condition. The applicant's invention also substantially eliminates the problems inherent in previous methods of applying a monomolecular film of lubricant to a surface.

The applicant mixes abrasive particles and a polar lubricant with a sufficient quantity of a nonpolar solvent to form a paste. The term paste means, for purposes of this application a composition comprising a polar lubricant, abrasive particles, and a nonpolar solvent wherein the amount of polar lubricant in the composition is substantially greater than the amount of polar compound in the surface film which is cleaned (removed) from the surface to be lubricated. The viscosity of the composition is not critical and will vary from very high to very low depending on various constituents. This paste (composition) is rubbed against the surface of a solid so as to simultaneously chemically clean the surface and allow the lubricant to be adsorbed thereto. The relative movement between the paste and the surface causes the abrasive particles to remove the surface film contamination on the surface to be lubricated and exposes the high energy level substrate surface. However it should be noted, that the high energy level substrate surface is not exposed to the environment since the paste completely covers the cleaned surface. Therefore no contamination of the substrate surface can occur. The lubricant is thus positioned adjacent to the substrate surface and readily absorbs thereto. All of the excess paste is then removed from the surface except for a monomolecular film of lubricant by suitable cleaning method such as scrubbing the surface with a detergent solution. Adhesion of the monomolecular film of lubricant to the substrate surface is much higher than the adhesion between the outer surface of the monomolecular film and any molecules adhering thereto. Consequently by sufficiently cleaning the surface the low adhesion between the monomolecular film and the other molecules is overcome and the other molecules are removed. However the strong adhesion between the monomolecular film of lubricant and the substrate is not disturbed so that a single monomolecular film is retained upon the surface to be lubricated.

The applicant's invention will become apparent from a study of the accompanying specification and claims. The following examples are illustrative of the applicant's invention.

*Example I*

The specimen to be lubricated is a cylindrical shaft of a hydrodynamic journal bearing which has an aluminum oxide surface thereon. Since the abrasive particles function to remove the surface film contamination from the surface to be lubricated, the abrasive is chosen with reference to the hardness of the surface to be lubricated. The abrasive which is utilized for cleaning an aluminum oxide surface is cerium oxide. The size of the abrasive particles is also important in the cleaning process. The monomolecular films are approximately twenty-five Angstroms thick so that the surface which is lubricated must be extremely smooth. Excellent results have been obtained with abrasive particles having a diameter of .1 micron (twenty-five Angstroms would equal .0025 micron).

A suitable polar lubricant must be chosen for the aluminum oxide surface to be lubricated. A polar lubricant, as utilized in this application, is defined as a polar straight chain compound having at least 10 carbon atoms therein which is capable of close packing (that is, no side branches). One end of the straight chain compound must be strongly polar so as to be strongly adsorbed to the surface to be lubricated and the other end must have a low energy end grouping so as to provide an oleophobic surface. Molecular chain length must be essentially constant for optimum planar alignment of the oleophobic end groups of the polar molecules. Acids, amines, or alcohols satisfying these requirements may be utilized. Examples of such an acid are stearic acid, perfluro octanonic acid, and arachidic acid. Examples of such an amine are octadecyl amine and hexadecyl amine. Examples of such an alcohol are eicosyl alcohol and octadecyl alcohol. Excellent results were obtained in utilizing stearic acid as the polar lubricant for the aluminum oxide surface. Stearic acid is a solid material at room temperature and a suitable nonpolar solvent must be utilized to combine the abrasive particles (cerium oxide) and the polar lubricant (stearic acid) into a paste. Only as much mineral oil as necessary to form a paste-like consistency is required; this obvious to one skilled in the art. The relative proportions of the stearic acid and the cerium oxide are not critical. Five parts abrasive particles and ninety-five parts polar lubricant have proven satisfactory, as has fifty parts abrasive particles and fifty parts polar lubricant. The amount of polar lubricant in the composition must be substantially greater than the amount of polar compounds contained in the surface film which is removed in cleaning the surface to be lubricated. Such amount is obvious to those skilled in the art. This insures that the polar lubricant adsorbs to the surface rather than another polar compound. The solvent utilized must be substantially nonpolar relative to the lubricant so that the solvent does not have a tendency to adsorb to the high energy substrate surface.

The paste comprising abrasive particles, polar lubricant, and nonpolar solvent is positioned upon a piece of micro-cloth (polishing cloth) which is in turn poistioned upon a resilient material such as a sponge. The sponge is positioned over a smooth rigid surface such as a normal work table. The paste is then rubbed against the surface of the cylindrical shaft for a period of one to two minutes by moving the shaft relative to the micro-cloth. The resilient material allows the pressure to be applied around a large segment (approximately 90°) of the aluminum oxide surface of the cylindrical shaft. The shaft is then rotated 90° and again the paste is rubbed against the surface for a period of one or two minutes. This continues until the paste has been rubbed against the entire surface.

Rubbing the paste against the aluminum oxide surface causes the cerium oxide abrasive to abrade the surface and remove the surface film contamination thereby chemically cleaning or ultra-cleaning the aluminum oxide surface. As soon as the high energy substrate surface is exposed the stearic acid compound is adsorbed thereto. It should be noted, that this cleaning of the surface to be lubricated is being accomplished under the paste, that is, there is no exposure of the ultra-clean surface to the atmosphere. Since the lubricant is contained in the paste, the desired lubricant is contiguous the surface and is adsorbed thereto. As the lubricant adsorbs to the surface, the long straight chain molecules pack closely relative to one another so as to form an oleophobic surface on the aluminum oxide shaft. As previously mentioned, the applicant utilizes polar lubricants which are strongly polar straight chain compounds having at least ten or more carbon atoms in the chain. One end of the straight chain compound must be strongly adsorbed to the high energy, ultra-clean surface; the other end must have a low free-energy end grouping so as to form an oleophobic (low free energy) surface.

The stearic acid compound is approximately five Angstroms square in cross section and twenty-five Angstroms in length. At one end of the stearic acid compound is the acid grouping which is strongly adsorbed to the clean surface and at the opposite end is the low free-energy methyl group. Because the acid grouping of the stearic acid compound is strongly polar it has a strong affinity for the high energy substrate surface of the aluminum oxide and strongly adsorbs thereto. The stearic acid compound is thus adsorbed to the surface such that the compound is standing on end. Since the stearic acid compound is a straight chain compound with no side branches another identical compound may be positioned adjacent thereto. This results in extremely close packing of the stearic acid compound as to provide a uniform monolayer over the whole surface to be lubricated. The acid group end of the compound is strongly adsorbed to the aluminum oxide surface and the methyl grouping at the opposite end provides a low energy (oleophobic) surface. Any molecules which may attach to the methyl end of the stearic acid compound are attached thereto with a much weaker affinity than exists between the acid end of the compound and the high energy substrate surface of the aluminum oxide.

The fact that the outer surface of the stearic acid compound presents a relatively low energy surface with a low affinity for any other molecules allows all of the paste to be removed from the aluminum oxide surface except for a monomolecular film of the stearic acid. The excess paste is removed by scrubbing the surface with a nylon brush and a commercial detergent solution. A normal dishwashing detergent has proven satisfactory. With sufficient scrubbing for three or four minutes all of the excess of the paste with the exception of the monomolecular film of the stearic acid adsorbed to the aluminum oxide surface will be removed. The surface is then rinsed with clean distilled water. This scrubbing and cleaning process takes approximately three minutes. The cleaning process can be accelerated by utilizing a solvent (e.g., benzene) vapor degreasing of the aluminum oxide surface after scrubbing with the detergent solution. However the vapor degreasing is not absolutely necessary.

After the cleaning process, the aluminum oxide surface is tested to determine that a monomolecular film of stearic acid remains and that the film is uniform over the whole surface. The non-wetting characteristic of the oleophobic film provided by the stearic acid compound, that is the methyl group end thereof, is utilized in this test. A low viscosity organic solvent is utilized which has a surface tension greater than twenty-five dyne centimeters. Benzene has proven to be a satisfactory test solvent. It is recognized that the viscosity and surface tension of the test solvent may vary over a range of values in accordance with the temperature thereof. However, the particular viscosity and surface tension necessary to perform the test is obvious to those skilled in the art. The aluminum oxide shaft is immersed within the test solvent and slowly removed. If the surface is dry, that is the test solvent does not wet the surface, it indicates a monomolecular film of lubricant has been adsorbed upon the surface. It is important to note that any molecules which attach to the methyl group end of the stearic acid compound and which have not been removed by the cleaning process will be indicated by wetting the surface. Thus the test indicates whether or not a monomolecular film of lubricant has been adsorbed upon the aluminum oxide surface.

*Example II*

The surface to be lubricated is tungsten carbide. As stated in Example I, a particular abrasive must be chosen which will abrade the tungsten carbide material and remove the surface film therefrom so as to expose the high energy level substrate surface to the lubricant. Because tungsten carbide is a harder surface than aluminum oxide alumina particles may be utilized. Again the abrasive size is .1 micron. The cerium oxide abrasive particles may be utilized for tungsten carbide surface however a longer period of rubbing is required to obtain a chemically clean surface. Stearic acid is used as the polar lubricant. The stearic acid is mixed with the alumina in a ten-to-one ratio. The substantially nonpolar solvent to be utilized in this case was kerosene. Only as much kerosene as necessary to form a paste-like consistency is required. This is obvious to one skilled in the art.

This paste is rubbed against the tungsten carbide surface in the manner set forth in Example I so as to clean the surface and allow the stearic acid to adsorb thereto. The excess paste is removed as set forth in Example I. The surface is tested with a test solvent as set forth in Example I.

*Example III*

The polar lubricant to be utilized is a straight chain acid compound such as arachidic acid. This acid compound is mixed with abrasive particles which are capable of adsorbing the surface to be lubricated so as to remove the surface film contamination thereon. The relative proportions of the abrasive and the lubricant are not critical. A wide choice of abrasive particles is available, the sole requirement being that the abrasive particles are capable of abrading the surface to be lubricated. The polar lubricant and abrasive particles are mixed with a substantially nonpolar solvent so as to provide a paste-like consistency. The amount of solvent necessary to provide the paste-like consistency is obvious to one skilled in the art. The requirement that the solvent be nonpolar relative to the lubricant insures that the solvent compounds will not adsorb to the free energy surface.

The paste is rubbed against the surface to be lubricated so as to clean the surface and allow the acid compound to adsorb to the surface. The excess paste is then removed from the surface except for a monomolecular film of the acid compound by scrubbing the surface as explained in Example I. The surface is then tested to insure that a monomolecular film of acid is adsorbed thereto as explained in Example I.

*Example IV*

The polar lubricant to be utilized is a straight chain compound such as eicosyl alcohol or octadecyl alcohol. This alcohol compound is mixed with abrasive particles which are capable of abraiding the surface to be lubricated so as to remove the surface film contamination therefrom. The relative proportions of the abrasive and the lubricant are not critical. A wide choice of abrasive particles is available, the sole requirement being that the abrasive particles are capable of abrading the surface to be lubricated. The polar lubricant and abrasive particles are mixed with a substantially nonpolar solvent so as to provide a paste-like consistency. The amount of solvent necessary to provide the paste-like consistency is obvious to one skilled in the art. The requirement that the solvent be nonpolar relative to the lubricant insures that the solvent compounds will not preferentially adsorb to the high free energy surface.

This paste is rubbed against the surface to be lubricated so as to clean the surface and allow the acid compound to adsorb to the surface. The excess paste is then removed from the surface except for a monomolecular film of the acid compound by scrubbing the surface as explained in Example I. The surface is then tested to insure that a monomolecular film of acid is adsorbed thereto as explained in Example I.

Thus the applicant has provided a new composition and process for applying a monomolecular film of a polar lubricant to a surface in a simple, easy, rapid manner. The composition comprises a straight chain compound which is strongly polar and has ten or more carbon atoms therein. In addition the compound must be capable of close packing, that is not side branches or cross-coupling. The polar lubricant is mixed with abrasive particles which are capable of abrading the surface to be lubricated so as to remove the surface film therefrom. The polar lubricant and the abrasive particles combined with a nonpolar solvent so as to provide a paste-like consistency. The process of applying the monomolecular film of lubricant to the surface includes the preparing the paste of polar lubricant, abrasive particles, and solvent, rubbing the paste against the surface to be lubricated so as to clean the surface and allow the lubricant to be adsorbed thereto, and removing all of the excess paste from the surface except for a monomolecular film of lubricant.

While I have shown and described examples of this invention, further modifications and improvements will appear to those skilled in the art. I desire it to be understood therefore that this invention is not limited to the particular form shown and I intend in the appended claims to cover all modifications which do not depart from the scope of this invention.

1. A process for applying a monomolecular film of a polar lubricant to the surface of a solid comprising the steps of:

mixing from 5 to 95 parts of abrasive particles selected from inorganic compounds which are capable of abrading the surface to be lubricated, from 95 to 5 parts of a polar lubricant selected from the group consisting of organic acids, amines and alcohols, and a sufficient amount of a nonpolar liquid hydrocarbon solvent to form a paste of the abrasive particles and the polar lubricant;

rubbing said paste against the surface of the solid so as to simultaneously clean the surface film contamination from said surface and allow said lubricant to adsorb to said surface; and scrubbing said surface with a detergent solution so as to remove all of said paste from said surface except for a monomolecular film of lubricant.

2. The process of claim 1 wherein said abrasive particles are metal oxides.

References Cited by the Examiner

UNITED STATES PATENTS

| | | | |
|---|---|---|---|
| 1,986,388 | 1/1935 | Calcott et al. | 106—8 |
| 2,078,876 | 4/1937 | Hennessey | 106—8 |
| 2,129,377 | 9/1938 | Libovitz et al. | 106—8 |
| 2,344,671 | 3/1944 | Bertsch | 252—11 X |
| 3,079,338 | 2/1963 | Caubet | 252—25 X |
| 3,211,647 | 10/1965 | O'Holloran et al. | 2 2—50 X |
| 3,211,683 | 10/1965 | O'Holloran | 252—50 |

FOREIGN PATENTS

| | | |
|---|---|---|
| 1,256,683 | 2/1961 | France. |
| 1,359,624 | 3/1964 | France. |
| 199,993 | 7/1923 | Great Britain. |
| 204,568 | 10/1923 | Great Britain. |

DANIEL E. WYMAN, *Primary Examiner.*

I. VAUGHN, *Assistant Examiner.*